United States Patent
Ishii et al.

(10) Patent No.: US 11,656,458 B2
(45) Date of Patent: May 23, 2023

(54) OPTICS OF A DISPLAY USING AN OPTICAL LIGHT GUIDE

(71) Applicants: Fusao Ishii, Pittsburgh, PA (US); NTT DOCOMO, INC., Tokyo (JP)

(72) Inventors: Fusao Ishii, Pittsburgh, PA (US); Mikiko Nakanishi, Tokyo (JP); Kazuoki Ichikawa, Tokyo (JP); Mikio Iwamura, Tokyo (JP)

(73) Assignees: Fusao Ishii, Pittsburgh, PA (US); NTT DOCOMO, Inc., Toyko (JP)

( * ) Notice: Subject to any disclaimer, the term of this patent is extended or adjusted under 35 U.S.C. 154(b) by 45 days.

(21) Appl. No.: 16/934,536

(22) Filed: Jul. 21, 2020

(65) Prior Publication Data

US 2021/0026135 A1 Jan. 28, 2021

Related U.S. Application Data

(63) Continuation-in-part of application No. 16/255,799, filed on Jan. 23, 2019.

(60) Provisional application No. 63/019,388, filed on May 3, 2020, provisional application No. 62/962,566, filed on Jan. 17, 2020.

(51) Int. Cl.

| | |
|---|---|
| *G02B 26/00* | (2006.01) |
| *G02B 27/01* | (2006.01) |
| *G02B 27/12* | (2006.01) |
| *F21V 8/00* | (2006.01) |
| *G02B 13/22* | (2006.01) |
| *G02B 5/09* | (2006.01) |

(52) U.S. Cl.
CPC ............ *G02B 27/0101* (2013.01); *G02B 5/09* (2013.01); *G02B 6/001* (2013.01); *G02B 6/0006* (2013.01); *G02B 6/0028* (2013.01); *G02B 6/0075* (2013.01); *G02B 13/22* (2013.01); *G02B 2027/0123* (2013.01)

(58) Field of Classification Search
CPC ....... A61B 3/113; A61B 3/103; A61B 3/1225; B60R 1/00; G01S 11/12; G01S 1/02; A01B 69/001; G02B 27/144; G02B 27/0172; G02B 27/145; G02B 27/1013; G02B 27/0149; G02B 27/0103; G02B 27/0101; G02B 27/017; G02B 27/01; G09G 3/003; H04N 7/18; G06T 19/00; G06T 19/006; G05D 1/0038; G05D 1/0246
USPC ..... 359/629–636, 618, 639, 13–14; 345/7–9, 345/632–633, 207; 348/113–120; 349/11; 351/210, 221, 200
See application file for complete search history.

(56) References Cited

U.S. PATENT DOCUMENTS

| | | |
|---|---|---|
| 6,115,151 A | 9/2000 | Popovich |
| 6,805,490 B2 | 10/2004 | Levola |
| 7,181,108 B2 | 2/2007 | Levola |

(Continued)

FOREIGN PATENT DOCUMENTS

WO 1999052002 A1 10/1999

*Primary Examiner* — Dawayne Pinkney
(74) *Attorney, Agent, or Firm* — Young Basile Hanlon & MacFarlane, P.C.

(57) ABSTRACT

A projection display having an optical light guide for a see-though display system using holographic optical element or diffractive optical element as in-coupling optics and combined with Fresnel mirrors as out-coupling optics is disclosed. A display using this light guide enables a wide angle (e.g., over 90 degrees field of view), high resolution, and a large eye-box with a compact size.

25 Claims, 18 Drawing Sheets

(56) References Cited

U.S. PATENT DOCUMENTS

| | | |
|---|---|---|
| 7,184,615 B2 | 2/2007 | Levola |
| 7,764,413 B2 | 7/2010 | Levola |
| 7,885,506 B2 | 2/2011 | Levola |
| 8,155,489 B2 | 4/2012 | Saarikko et al. |
| 8,160,411 B2 | 4/2012 | Levola et al. |
| 8,314,993 B2 | 11/2012 | Levola |
| 8,320,032 B2 | 11/2012 | Levola |
| 9,304,235 B2 | 4/2016 | Sainiemi et al. |
| 9,513,480 B2 | 12/2016 | Saarikko et al. |
| 9,625,717 B2 | 4/2017 | Sunnari et al. |
| 9,910,276 B2 | 3/2018 | Vallius et al. |
| 10,018,844 B2 | 7/2018 | Levola et al. |
| 10,114,220 B2 | 10/2018 | Grey et al. |
| 10,156,725 B2 | 12/2018 | TeKolste et al. |
| 10,261,318 B2 | 4/2019 | Tekolste et al. |
| 10,317,677 B2 | 6/2019 | Levola |
| 10,345,601 B2 | 7/2019 | Levola et al. |
| 10,359,627 B2 | 7/2019 | Wall et al. |
| 10,359,635 B2 | 7/2019 | Grey et al. |
| 10,379,358 B2 | 8/2019 | Olkkonen et al. |
| 10,459,145 B2 | 10/2019 | Popovich et al. |
| 10,509,241 B1 | 12/2019 | Robbins et al. |
| 10,545,346 B2 | 1/2020 | Waldern et al. |
| 2001/0050758 A1* | 12/2001 | Suzuki ............... G02B 13/18 348/E5.142 |
| 2004/0085649 A1* | 5/2004 | Repetto ............ G02B 27/0172 359/633 |
| 2009/0296049 A1* | 12/2009 | Teradaira ............ G02B 13/22 353/102 |
| 2013/0128611 A1* | 5/2013 | Akutsu ............... G03H 1/0248 359/629 |
| 2014/0204185 A1* | 7/2014 | Liu .................... H04N 13/351 348/54 |
| 2015/0016777 A1 | 1/2015 | Abovitz et al. |
| 2016/0327789 A1 | 11/2016 | Klug et al. |
| 2017/0045743 A1* | 2/2017 | Dobschal ............... G02B 6/00 |
| 2017/0204185 A1* | 7/2017 | Chen ................. C07K 16/2827 |
| 2017/0293143 A1* | 10/2017 | Martinez ........... G02B 27/0172 |
| 2018/0003994 A1 | 1/2018 | Grey et al. |
| 2018/0052277 A1 | 2/2018 | Schowengerdt et al. |
| 2018/0059304 A1 | 3/2018 | Bhargava et al. |
| 2018/0067318 A1 | 3/2018 | St. Hilaire |
| 2018/0217305 A1 | 8/2018 | Valera |
| 2018/0292651 A1 | 10/2018 | Ha |
| 2019/0086668 A1 | 3/2019 | Ha |
| 2019/0204600 A1 | 7/2019 | Ha et al. |
| 2020/0259307 A1* | 8/2020 | Sharma ............ G02B 27/0179 |

\* cited by examiner $$d\theta_{out} = \frac{\cos(\theta_i)\, d\theta_i}{\cos(\theta_{out})}$$

$\theta_i = 0$ $\theta_{out} = 120$ $d\theta_{out} = -2\, d\theta_i$

OPTICS OF A DISPLAY USING AN OPTICAL LIGHT GUIDE

CROSS REFERENCE TO RELATED APPLICATIONS

This application claims priority to and is a continuation in part of U.S. application patent Ser. No. 16/255,799 filed Jan. 23, 2019, which claims the benefit of U.S. Provisional Patent Application Ser. No. 62/692,699 filed Jun. 30, 2018, each of which is incorporated herein in its entirety by reference. This application also claims the benefit of U.S. Provisional Patent Application Ser. No. 63/019,388 filed May 3, 2020, and U.S. Provisional Patent Application Ser. No. 62/962,566, filed on Jan. 17, 2020, each of which is incorporated herein in its entirety by reference.

TECHNICAL FIELD

This disclosure relates to optics of a display using an optical light guide (e.g., a see-through display for projecting an image through a thin light guide using a hologram or diffractive optical element).

BACKGROUND

See-through displays have received attention in recent years (e.g., for head-up-displays and wearable displays) in the context of smart phones being well accepted by the market. See-through displays provide hands free operation and provide an ability to show an image in the distance same as regular sight. While see-through displays are useful, in the past, some see-through displays (e.g., using holograms) have not necessarily satisfied viewers, because they do not provide a large enough viewing angle. Optical systems enabling light, small, bright, high resolution, and/or see-through characteristics would be useful, but there are challenges associated with some systems achieving a relatively large viewing angle.

SUMMARY

In one aspect, in general, a display system for providing light rays toward an eye of a viewer, comprises: a display device; a set of one or more lenses configured to receive light rays from the display device; a light pipe; an in-coupling optical element configured to receive light rays from said set of one or more lenses and provide light into said light pipe having three or more sides and at least a portion of surfaces of the sides of said light pipe are reflective by coating or total internal reflection; an out-coupling light guide; and one or more mirrors configured to reflect light rays from an exit portion of said light pipe into said out-coupling light guide. The one or more mirrors include at least a first Fresnel reflector that comprises a plurality of saw-tooth shaped grating elements configured to reflect rays into said out-coupling light guide, and said out-coupling light guide includes a second Fresnel reflector that comprises plurality of saw-tooth shaped grating elements.

Aspects can include one or more of the following features.

The in-coupling optical element comprises a prism, and said set of one or more lenses is telecentric, where principal rays emitted from pixels of the display device are substantially perpendicular to the surface of said display device and the principal rays cross each other within or in proximity to said prism.

The in-coupling optical element comprises a prism, said prism has a reflective surface configured to receive light rays from said set of one or more lenses and to reflect the light rays into said light pipe, and a normal vector of the reflective surface is between 15 and 45 degrees with respect to an optical axis of said set of one or more lenses.

The in-coupling optical element comprises a prism, said prism has a reflective surface configured to receive light rays from said set of one or more lenses and to reflect the light rays into said light pipe, and a normal vector of the reflective surface is configured to rotate to form an angle between 30 and 60 degrees with respect to a long side of said light pipe.

The in-coupling optical element comprises a prism, and a refractive index of said prism is over 1.4, and a refractive index of said light pipe is over 1.4.

A size of the exit portion varies based at least in part on a location of the exit portion along a long side of said light pipe.

The grating elements of said first Fresnel reflector are curved on a surface of a triangular prism in saw-tooth shape and said surface is tilted between 15 and 45 degrees with respect to a top surface of said light pipe and a normal vector of the first Fresnel reflector is set so that a light ray parallel to an optical axis of said set of one or more lenses is substantially parallel to a normal vector of the top surface of said light pipe.

The in-coupling optical element comprises a prism, and a refractive index of said prism is over 1.3, a refractive index of said out-coupling light guide is over 1.3, and the refractive index of said prism is substantially equal to the refractive index of said light guide.

The out-coupling light guide has a slant side forming a prism where light rays are able to enter, and a normal vector of the slant side is between 15 and 45 degrees with respect to a top surface of said light pipe to enable light rays from said one or more mirrors to be reflected into said out-coupling light guide.

The out-coupling light guide has a slant side forming a prism where light rays enter and the normal vector of the slant side is between 15 and 45 degrees with respect to a top surface of said light pipe to enable light rays from said one or more mirrors to be reflected into said out-coupling light guide.

The second Fresnel reflector includes a grating region that includes multiple saw-tooth shaped grating elements configured to reflect light rays from said one or more mirrors toward the eye of the viewer and flat regions between the saw-tooth shaped grating elements, where no saw-tooth shaped grating elements exist in the flat regions, and the out-coupling light guide reflects the light rays by total internal reflection and is substantially transparent so that external light can reach the viewer's eye, and the grating region includes a reflective coating.

The second Fresnel reflector includes a grating region that includes multiple saw-tooth shaped grating elements configured to reflect light rays from said one or more mirrors toward the eye of the viewer and flat regions between the saw-tooth shaped grating elements, where dual reflections by both the flat regions and the saw-tooth shaped grating elements are prevented by light absorbing areas.

At least one of said light pipe and/or said out-coupling light guide includes one or more layers that are configured to at least partially reflect light to reduce unilluminated areas.

A surface of said out-coupling light guide includes a curved envelope of multiple flat surfaces so that internally reflected light beams have the same angles as those of a flat surface.

Angles of multiple saw-tooth shaped grating elements of said second Fresnel reflector of said out-coupling light guide vary by location so that an image is focused at a finite distance.

The display system further comprises: a plurality of sets of the display system overlaid so that images at multiple distances are viewable.

The display system further comprises: a plurality of waveguides integrated into a single waveguide using one or more dichroic filters and at least one dichroic cross prism.

At least one of said light guide and/or said light pipe is coated with a holographic optical element, a diffractive optical element, or a multi-layer thin film so that a total internal reflection angle is reduced to enlarge a field of view of the display system.

At least one of said light guide and/or said light pipe comprises a lower refractive index material adjacent to said in-coupling optical element and a higher refractive index material within or in proximity to the out-coupling light guide.

The light guide is laminated with higher refractive index material than a refractive index of said light guide, and said second Fresnel reflector is formed on the higher refractive index material.

The in-coupling optical element comprises a first optical element comprising at least one of a holographic optical element (HOE) and/or a diffractive optical element (DOE) aligned so that a subtending angle of diffracted light beams is lower than a subtending angle of incoming light beams, and a second optical element comprises at least one of a HOE and/or DOE placed in the light guide to receive light from the light pipe and the second optical element is aligned so that a subtending angle of outgoing light beams is larger than the subtending angle of the incoming light beams, and an angle of outgoing light from a normal direction of the second optical element is substantially equal to an angle of incoming light to a normal direction of the first optical element for a light beam from a same pixel.

In another aspect, in general, a display system comprises: a display device; a set of one or more lenses configured to receive light rays from the display device; an in-coupling optical element configured to receive light rays from said set of one or more lenses; an out-coupling light guide; and one or more mirrors configured to reflect light rays into said out-coupling light guide. A diffractive optical element (DOE) in at least one of the in-coupling optical element or the out-coupling light guide is configured to use 7th order diffraction for light including a blue spectral component, 6th order diffraction for light including a green spectral component, and 5th order diffraction for light including a red spectral component.

Aspects can include one or more of the following features.

The display system further comprises: a light pipe configured to couple light between a first DOE in the in-coupling optical element and a second DOE in the out-coupling light guide.

The display system further comprises: an optical element with an electronically controllable focal distance.

The optical element with an electronically controllable focal distance is configured to display multiple images at multiple respective distances sequentially synchronized with the display device.

Aspects can have one or more of the following advantages.

Some implementations of the display systems described herein work as a periscope with a thin light guide (e.g., a waveguide or light pipe) combined with prisms or Fresnel mirrors having reflective surfaces. The display systems may be suitable for see-through head-up-displays for automobiles, and can be configured as wearable displays (e.g., as compact as eyeglasses), and can be configured to achieve a wide viewing angle (also referred to as field of view, high resolution, and a large eye-box.

Some implementations are capable of increasing the field of view (FOV) of a display using a light guide, such as a waveguide or a light pipe, to pass light from a display to a viewer. In some examples, the angle subtending incoming light into a waveguide remains same if the optical system of the waveguide uses only specular reflection. This means, in such examples, the FOV is identical to the subtending angle of incoming light and the FOV can be increased using a larger angle of converging incoming light into a waveguide, which can be achieved by using more lenses or more complex optical system, for example. Generally, a holographic optical element (HOE) or diffractive optical element (DOE) will increase the subtending angle of diffracted light when it is used as in-coupling optics, and a HOE or DOE will decrease the subtending angle of diffracted light when it is used as out-coupling optics. Some implementations of the systems and devices described herein use HOE or DOE for in-coupling optics to increase the subtending angle of diffracted light and use specular reflection for out-coupling, which maintains the subtending angle (e.g., no-increase and no-decrease). Because of the combination of diffractive optics for in-coupling where the incident light beams are expanded, and geometrical optics, which do not change the subtending angles of light beams, the resulting combined optics configuration will expand the subtending angle (d$\theta$i to d$\theta$out) and increase the FOV. As in the example shown in FIG. 4, d$\theta$out is larger than d$\theta$i. If the reflector (403 in FIG. 4) is an ordinary mirror, d$\theta$i=d$\theta$out and the subtending angle will not be increased, but if the reflector 403 is a HOE or DOE, for example, the angle will be increased.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
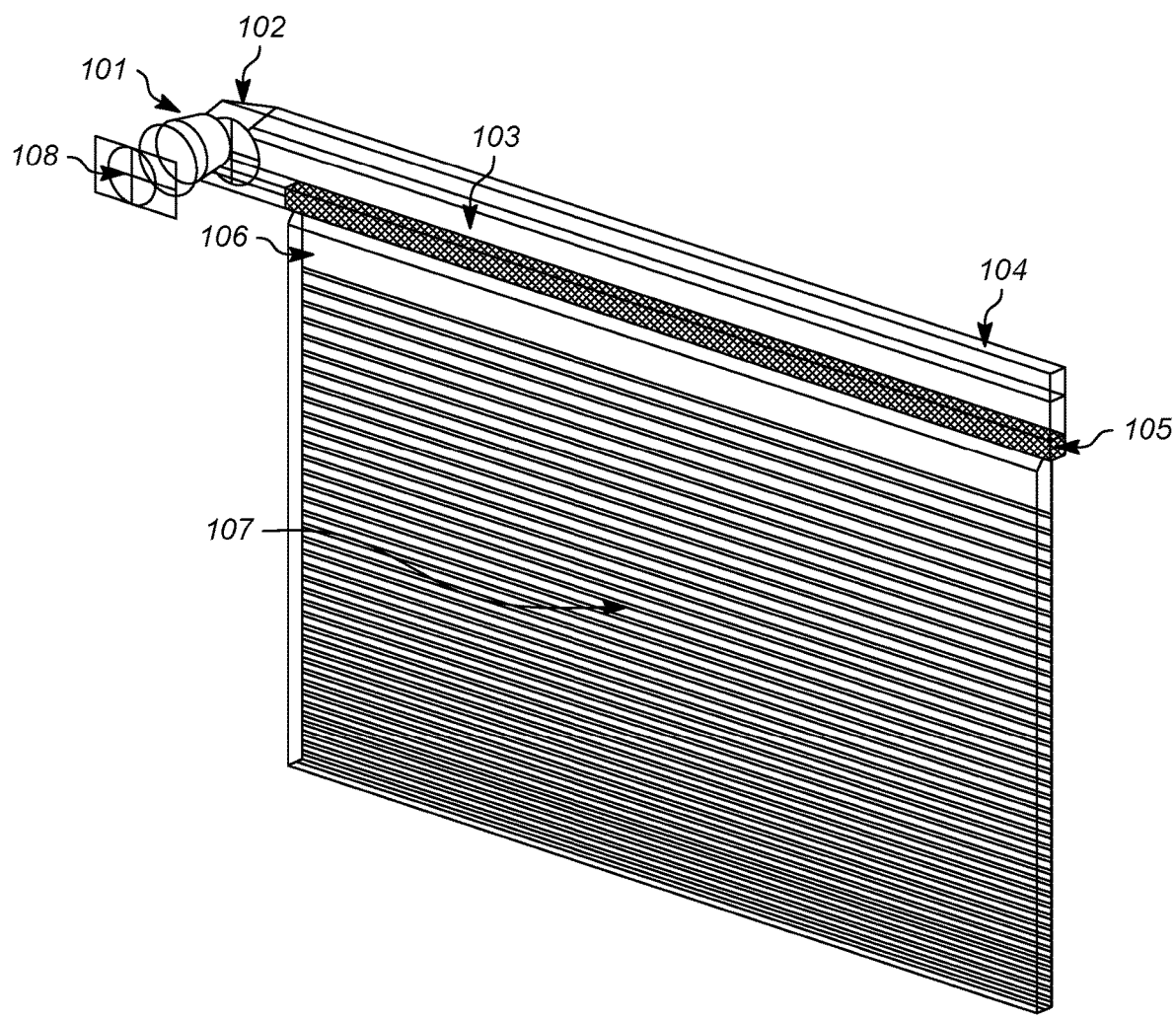
FIG. 1 is a diagram of an example optics system enabling a see-through display forming a virtual image using prism and Fresnel mirrors.

A characteristic of some implementations of a display system is a relatively large FOV of a see-through display (e.g., over 90 degrees (or +/−45 degrees) horizontally with an eye-box larger than 15 mm). An example implementation of a display system is shown in FIG. 1. A display system 104 includes a display device 108 comprising an array of pixels and a set of projection lenses 101. Light rays from the display device 108 are projected on a HOE 102 used as in-coupling optics and inputted to a light pipe 103. The light rays propagate into the light pipe 103 and only the light rays having the same direction as the original rays from the HOE 102 are selected and lead to folding mirrors 105. The light rays are reflected by the folding mirrors 105 about 90 degrees toward an out-coupling light guide 107. In some implementations, the light guide 107 is a plate or slab waveguide that guides light between surfaces at interfaces with air or some lower index material by total internal reflection (TIR), and in some implementations the light guide 107 is a plate or slab that guides light reflected between reflective surfaces of the plate or slab. In this example, the light rays are reflected toward a viewer's eye by saw-tooth shaped Fresnel mirrors formed on a surface of the light guide 107. Examples of each element will be explained in more detail below.

In one aspect, the display system acts as an exit pupil expander. For example, a viewer should be able to see an image even when he/she moves their eyeballs. Some systems only have a relatively small exit pupil (e.g., 0.5 mm diameter exit pupil, for example, on the order of a mobile phone's camera lens). But, a human eyeball can move +/−half an inch, or a 1-inch range. The exit pupil expander functionality of the display system described herein is able to expand the exit pupil from around a 0.5 mm diameter to around a 1 in (25.4 mm) diameter.

An in-coupling HOE or DOE can redirect light beams from an external projector lens system to the inside of a light pipe. Some of the light beams exit from the light pipe through one or more slits or other openings to a Fresnel reflector. The light beams are reflected by an out-coupling element, such as a Fresnel reflector composed of individual reflective grating elements (also referred to herein as "Fresnel mirrors"), toward the outside of the light pipe to enter a light guide. The beams hit a second in-coupling HOE or DOE attached to the light guide and are reflected toward the inside of the light guide. After propagating inside the light guide, beams are reflected by out-coupling Fresnel mirrors to an eyeball of a viewer. The light guide can be implemented, for example, as a light guide plate (flat rectangular plate with surfaces of around 50 mm×50 mm in size).

Examples of some of the features that contribute to the ability of the display system to act as an exit pupil expander include the following. The incoming beam angle can be compressed (e.g., 60 degrees to 20 degrees). The rays of the compressed beam propagate inside the light pipe to be redirected and distributed from multiple openings along the light pipe into the wide area of the light guide plate, allowing a much larger FOV. For example, the grating elements of a Fresnel folding mirror redirect the light to the light guide plate, which expands the exit pupil in a first dimension (e.g., an x-dimension). An out-coupling DOE, such as another Fresnel reflector, attached to the light guide plate also expands the angle of beams exiting to the viewer. The out-coupling Fresnel reflector expands the exit pupil in a second dimension (e.g., a y-dimension perpendicular to the x-dimension).

Additional features can be included in some implementations of the display system. For example, a single DOE is able to diffract three primary color beams into the same direction. This will reduce the number of needed layers of a light guide plate or other out-coupling optics (e.g., from 3 layers to a single layer). Also, images can be formed at each of multiple selected distances dynamically.

Figure 2A:
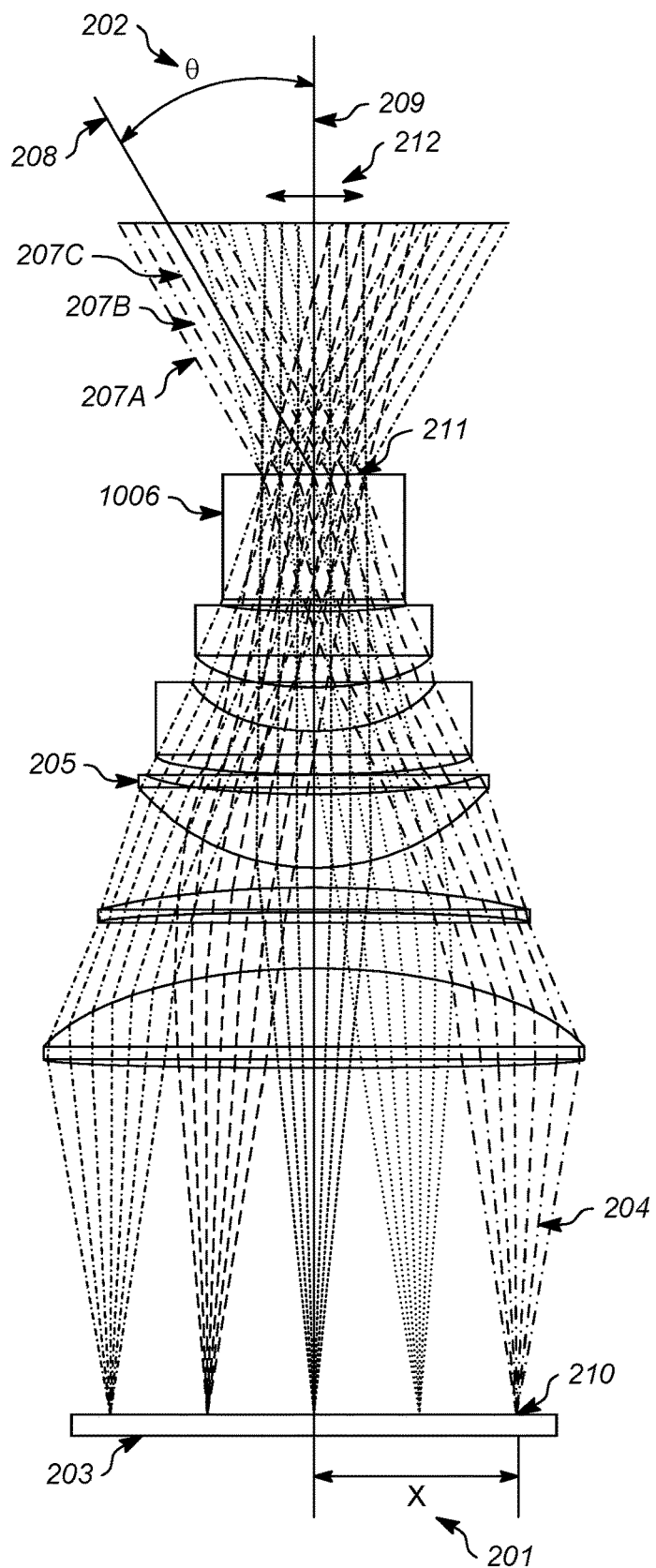
FIG. 2A is a diagram of an example projection lens assembly included as part of in-coupling optics.

Example implementations of different kinds of in-coupling optics are shown in FIGS. 2A, 2B, 2C, and 2D. In FIG. 2A, a display device 203 provides light to a set of projection lenses 205, and the distance between the center of the display device 203 and a given pixel (marked as "X" 201) is proportional to the projected angle θ 202 of light from that given pixel. For example, the projection lenses 205 are arranged into a lens assembly that ensures that the angle of an output light ray is proportional to the distance of pixel from the center of the pixel array (or θ is proportional to X). The display device 203 emits light beams 204 from each of its pixels to the set of projection lenses 205. This lens set 205 is designed as a telecentric optics arrangement meaning that the principal ray of light beams 204 from each pixel of the display device 203 entering the projection lens set 205 is substantially parallel to the optical axis of the projection lens set. This lens set 205 can be configured such that an image is focused at an infinite or substantially far distance so that all of the rays projected from a single pixel are substantially parallel to each other as shown for light rays 207A, 207B, and 207C in FIG. 2A. This feature is also called an F-Theta lens. This optics arrangement ensures that all the rays from a single pixel are parallel. This is a principle used in some implementations to focus an image after the rays are mixed in the light pipe, because this optics arrangement ensures that all rays having a same direction are from a single pixel.

Figure 2B:
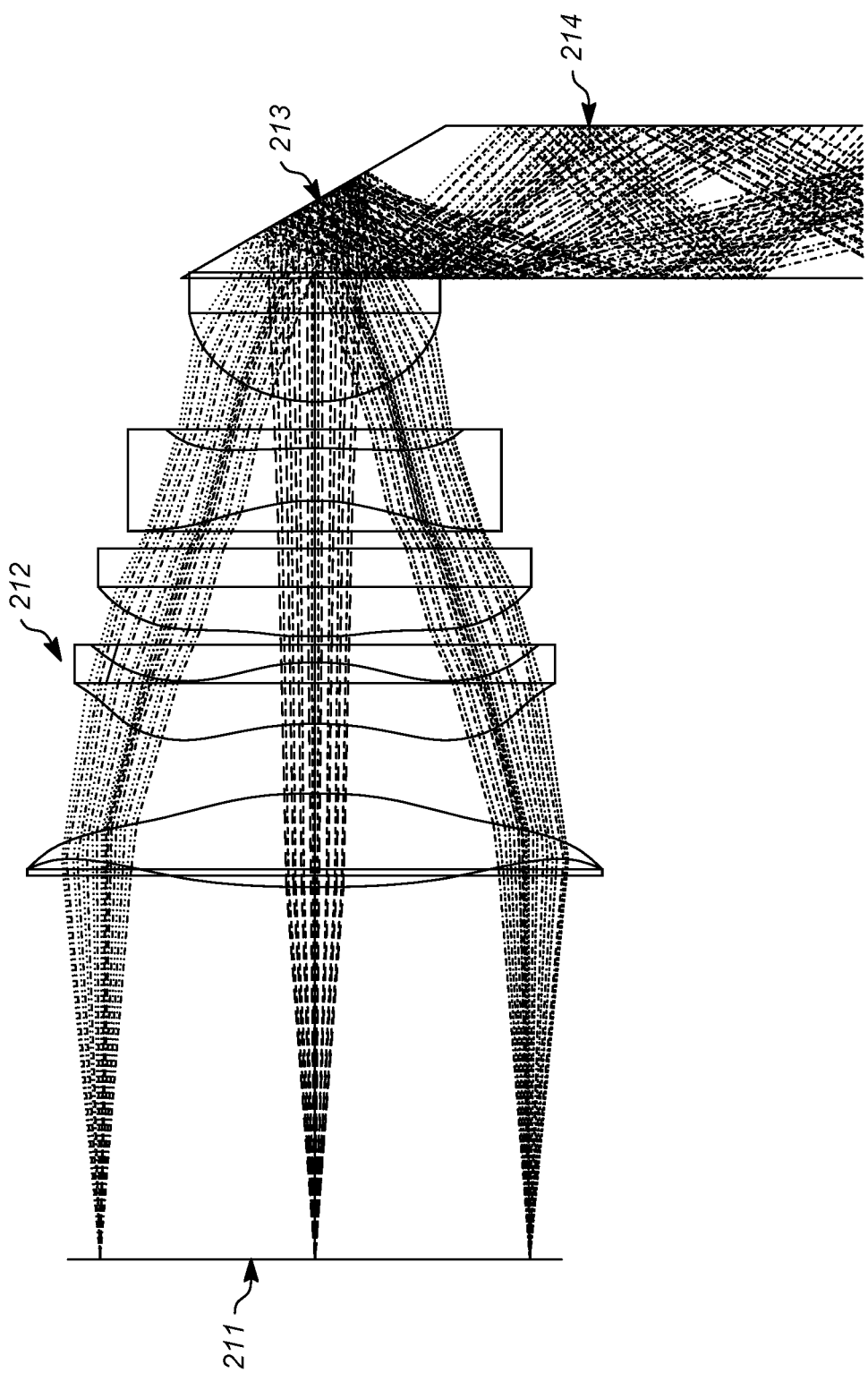
FIG. 2B is a diagram of an example of a light guide receiving light from a prism included as part of in-coupling optics.
Figure 2C:
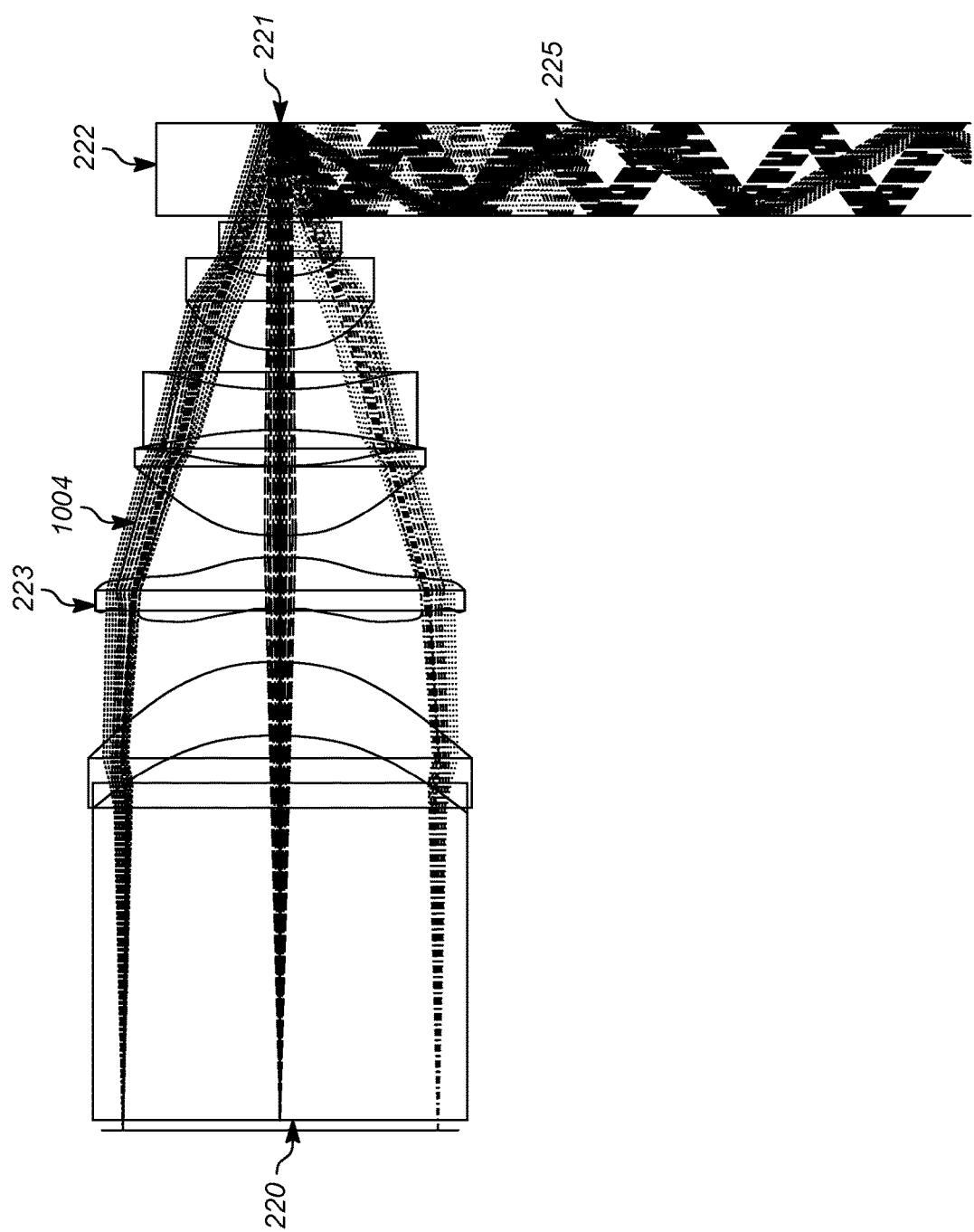
FIG. 2C is a diagram of an example of a light guide receiving light from a hologram included as part of in-coupling optics.
Figure 2D:
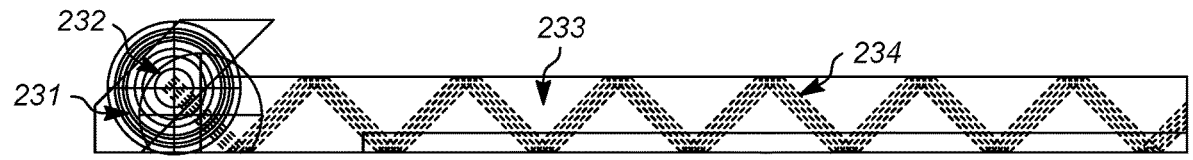
FIG. 2D is a diagram of an example of a light guide receiving light through a projection lens set and in-coupling optics.

FIG. 2B shows an example of a light guide 214 (e.g., a light pipe or a waveguide) having a prism 213 included as part of in-coupling optics receiving light from the display device 211 through a lens set 212. FIG. 2C shows an example of a light guide 225 (e.g., a light pipe or a waveguide) having a hologram 221 included as part of in-coupling optics 222 receiving light from the display device 220 through a lens set 223. FIG. 2D shows an example of a light guide 233 (e.g., a light pipe or a waveguide) with a projection lens set 231 providing light to in-coupling optics 232 (e.g., HOE or DOE or prism), showing a light beam 234 propagating inside the light guide 233.

Figure 3:
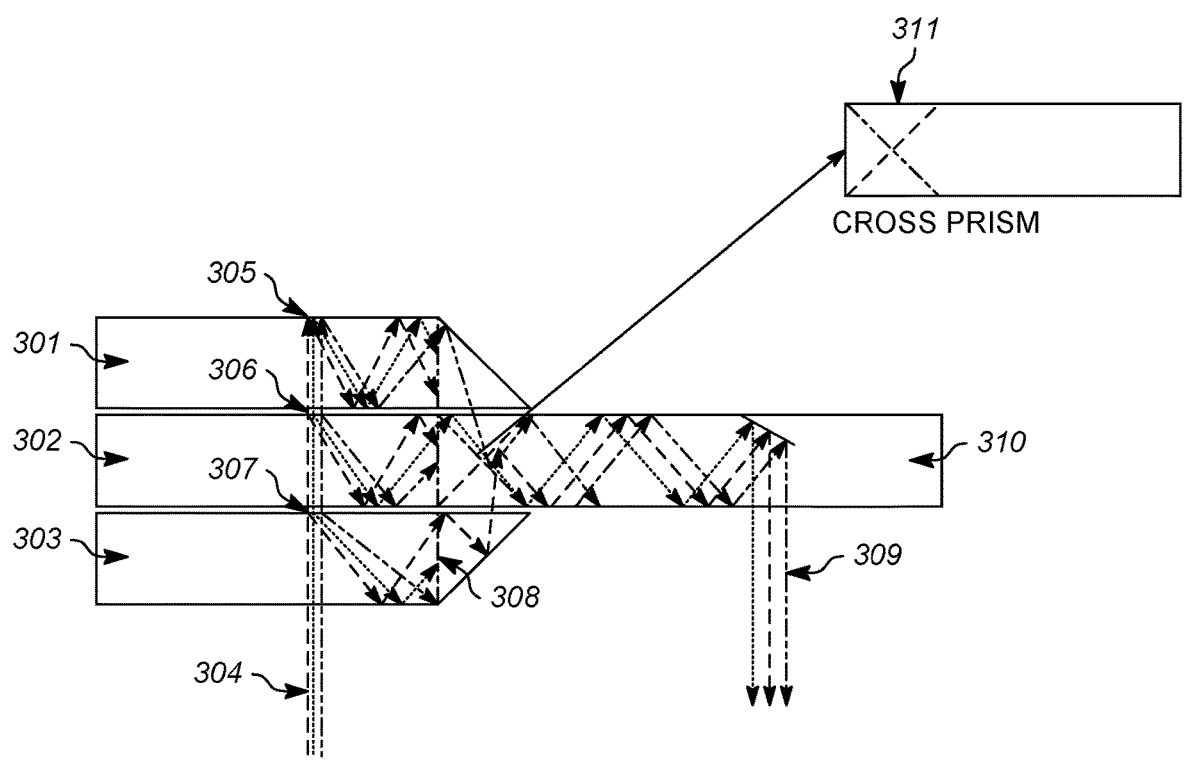
FIG. 3 is a diagram of an example display system.

Another example implementation is shown in FIG. 3, in which multiple waveguides 301, 302, 303 are integrated into a single waveguide (or layer) 310 using dichroic filters 308 and a cross prism 311. A HOE allows multiple recording and superimposing multiple wavelength holograms into a single layer. However, some types of hologram materials have a limitation of the maximum number of recording, and a surface relief type DOE does not allow multiple wavelength diffractions. These can use a multi-layer waveguide and often one layer for one color of incoming rays 304. For a color display, a 3-layer waveguide can be used. This example implementation enables a single layer waveguide for multi-color display integrating 3 color layers of a waveguide into a single layer with a dichroic filter 308 and a dichroic cross prism 311 as shown in FIG. 3. Optical element 303 is a waveguide for blue and has a HOE or DOE layer at 307. Light beams diffracted by the HOE or DOE contains 3 colors, but only blue is filtered by the dichroic filter marked as 308. Optical elements 302 and 301 are waveguides for green and red respectively. All three color light beams after the filters are lead into the cross prism 311 and integrated into the middle layer 310 for output as reflected rays 309. This integration of 3 layers into a single layer is not limited to waveguide, but also applicable to light pipe.

Figure 4:
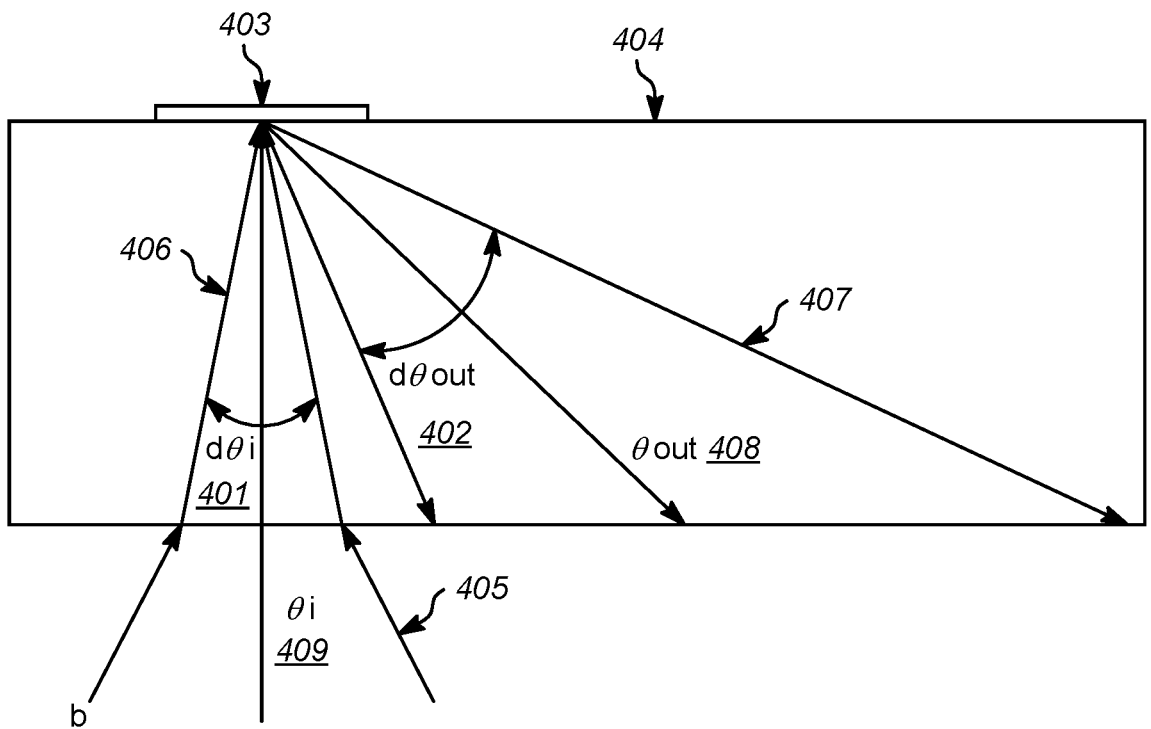
FIG. 4 is a diagram that illustrates how the incident angles of incoming light beams are enlarged by HOE or DOE.

Another example implementation is shown in FIG. 4. Incident light rays are shown as (e.g., between ray 405 and ray 406) and their subtending angle is shown as $d\theta i$ 401. The ray Oi 409 is the middle ray between them. The incident rays are focused to a HOE or DOE 403 and diffracted by the HOE or DOE 403 to an output angle subtending between ray 402 and ray 407. The angle $d\theta out$ is the angle of the middle ray $\theta out$ 408 between ray 402 and ray 407. Because $d\theta out = \cos(\theta i) * d\theta i / \cos(\theta out)$, $\theta i$ is about zero, and $\theta out$ is about 120 degrees, $d\theta out = -2 * d\theta i$. This means that the diffracted beam has a divergence of angles among its constituent rays that is twice as large as the incident beam. Thus, the incoming beam ray angles can be enlarged using the HOE or DOE. If the HOE or DOE is used as out-coupling optics, where $\theta i$ is about 60 degrees and $\theta out$ is about 180 degrees, the relation becomes opposite and $d\theta out = -0.5 \, d\theta i$. This means the angle will be reduced by half. Therefore, if the system uses a HOE or DOE for in-coupling and an ordinary optical reflector such as a mirror, prism, or Fresnel reflector, the system can obtain enlarged output angles from smaller incident angles. This will enlarge the FOV.

Figure 5:
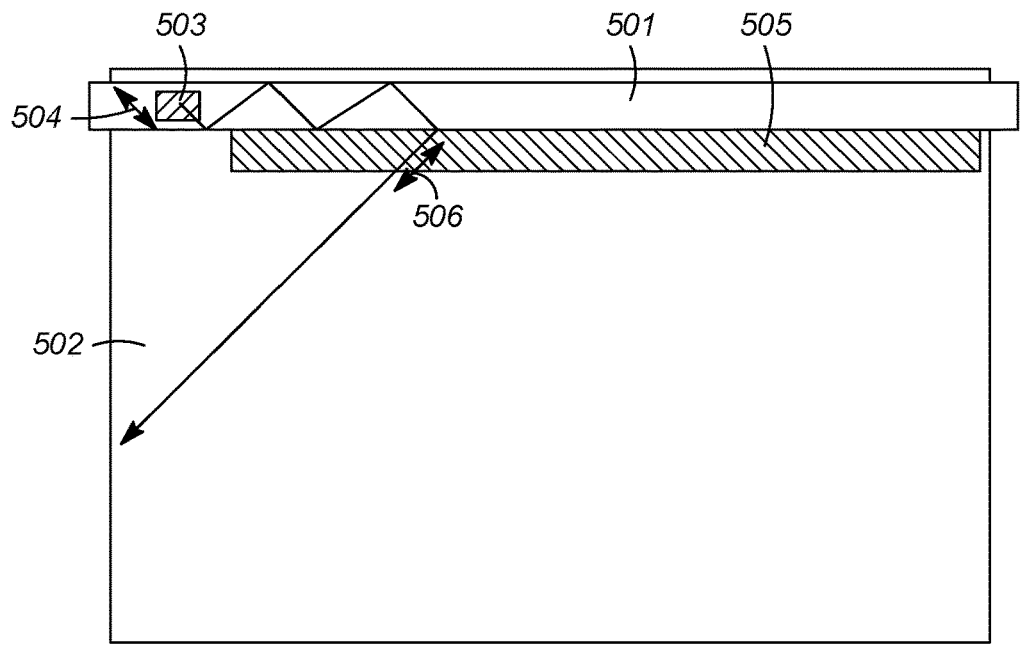
FIG. 5 is a diagram that illustrates why the angle of diffracted light beam is limited by the refractive index of HOE base material.

Another example implementation is shown in FIG. 5. A light pipe 501 receives light from an in-coupling optical element 503 (e.g., a HOE or DOE). A first expansion direction 504 indicates the direction of expansion of beam angles by the in-coupling optical element 503. The diffracted beams have a distortion of parallelogram toward the expansion direction 504. After the light beam exits the light pipe 501 through openings along the light pipe 501, the light beam enters a slab light guide 502. The openings along the light pipe 501 can be locations at which a reflective material is absent, or locations at which an angle of incidence is less than a total internal reflection angle for some of the rays that propagate along the light pipe 501. At the out-coupling optical element 505 (e.g., folding mirrors including Fresnel mirrors of a Fresnel reflector), a second expansion direction 506 can be configured to be perpendicular to the expansion direction 504 to minimize the distortion of images.

Figure 6:
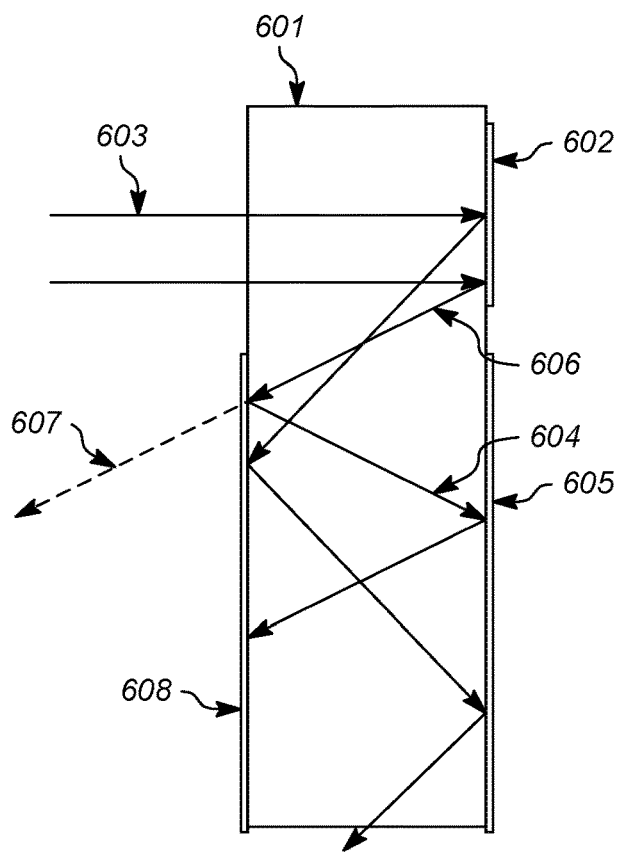
FIG. 6 is a diagram of an example of a light guide with a coating that reflects a light beam whose incident angle is lower than a TIR angle.

An example implementation of a light guide is shown in FIG. 6. In some cases, the light guide can be implemented as a waveguide with a high index core surrounded by a lower index cladding (e.g., which could be air in some cases). But, the FOV of a waveguide is limited by the minimum angle of total internal reflection (TIR) of the material used for waveguide core. To increase the FOV, for a light guide 601 configured as a light pipe, coatings 605, 608 on either surface of a transparent slab of material reflect a light beam whose constituent rays are incident at an angle that is lower than a TIR angle that would be associated with the slab material. An in-coupling optic 602 is a HOE or a DOE at which the incoming beams 603 are directed. If there were no coatings, the reflected beam 606 would be transmitted as a beam 607, but with the coating 608 the reflected beam 606 can be reflected as beam 604.

Figure 7:
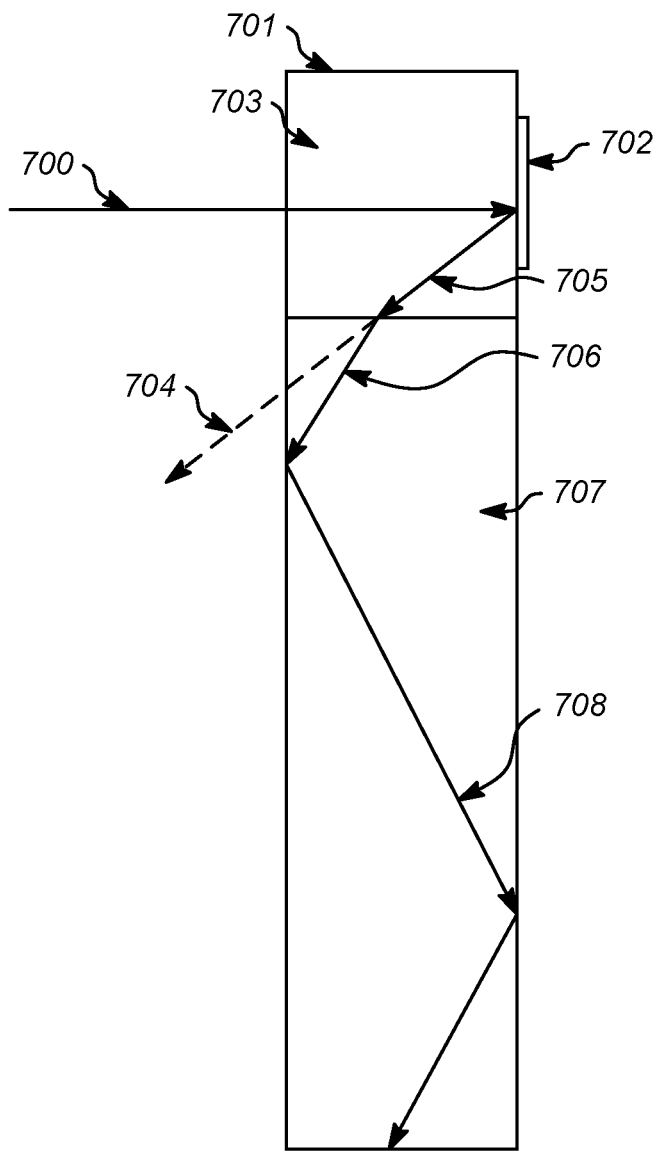
FIG. 7 is a diagram of another example of a light guide.

Another example implementation of a light guide is shown in FIG. 7. This light guide comprises two regions made up of two different materials (region 701 and region 707), each having a different refractive index. This example enables a HOE 702 to diffract an incoming beam 700 to a beam 705 that is incident below a TIR angle associated with the material 703 and leads to the region 707 having a higher refractive index and smaller TIR angle to enlarge the FOV. The maximum angle of a diffracted beam that is diffracted by the HOE 702 is limited due to the refractive index of HOE's base material and it calls for a low or similar refractive index material for a waveguide where HOE is placed. A waveguide can be connected with a higher refractive index material toward an out-coupling region, and the FOV can be increased by this technique. A diffracted beam 705 would be transmitted (as beam 704) if there was not a higher refractive index material in region 707, but the diffracted beam 705 can be reflected as shown by reflected beams 706 and 708.

Figure 8A:
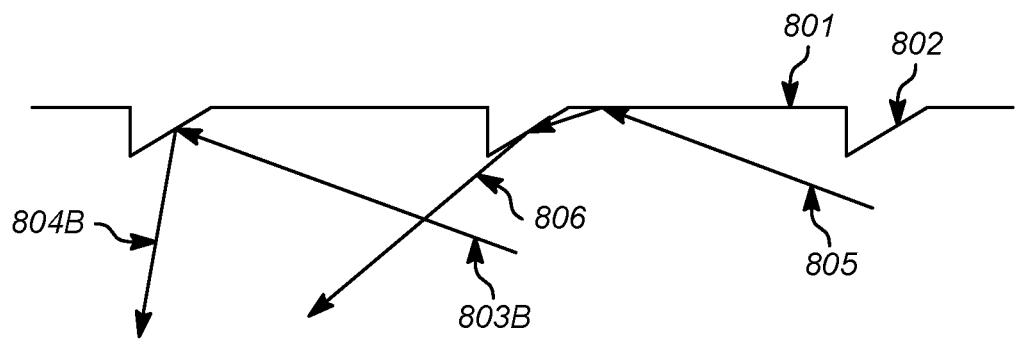
FIGS. 8A, 8B, and 8C are diagrams of example structures avoiding unwanted double reflection.
Figure 8B:
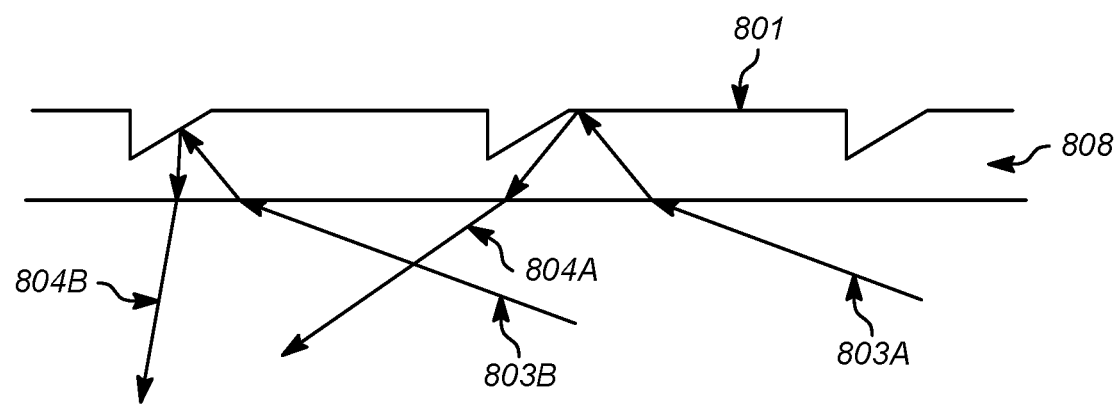
Figure 8C:
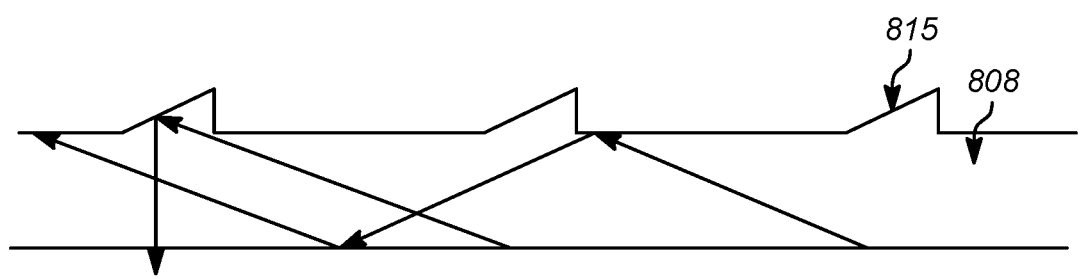

Example implementations of out-coupling from a light guide are shown in FIGS. 8A, 8B, and 8C. In these examples, unwanted double reflection (or "Ghost image") of a waveguide having Fresnel mirrors can be avoided. Waveguide material 808 has a higher refractive index than the material on either side. The waveguide is designed for a single reflection at the flat area 801 or the Fresnel mirror area 802 as shown for incoming rays 803A, 803B and reflected rays 804A, 804B, and double reflection as shown for an incoming ray 805 to a reflected ray 806 is unwanted. Another limiting factor of the FOV is this unwanted reflection by the individual saw-tooth shaped mirrors of the Fresnel reflector of a waveguide as shown in FIG. 8A. As the angle of a propagating light beam increases (larger angle from the normal vector of the surface of waveguide), beams may hit twice (as shown by beams 806) before out-coupling from the waveguide, which may not be desired. The example of FIG. 8B is to laminate a higher refractive index material 808 on waveguide and place Fresnel mirrors on the higher refractive index material 808. FIG. 8C shows another example to avoid double reflection with external saw-tooth shaped protrusion of Fresnel mirror grating elements 815.

Figure 9:
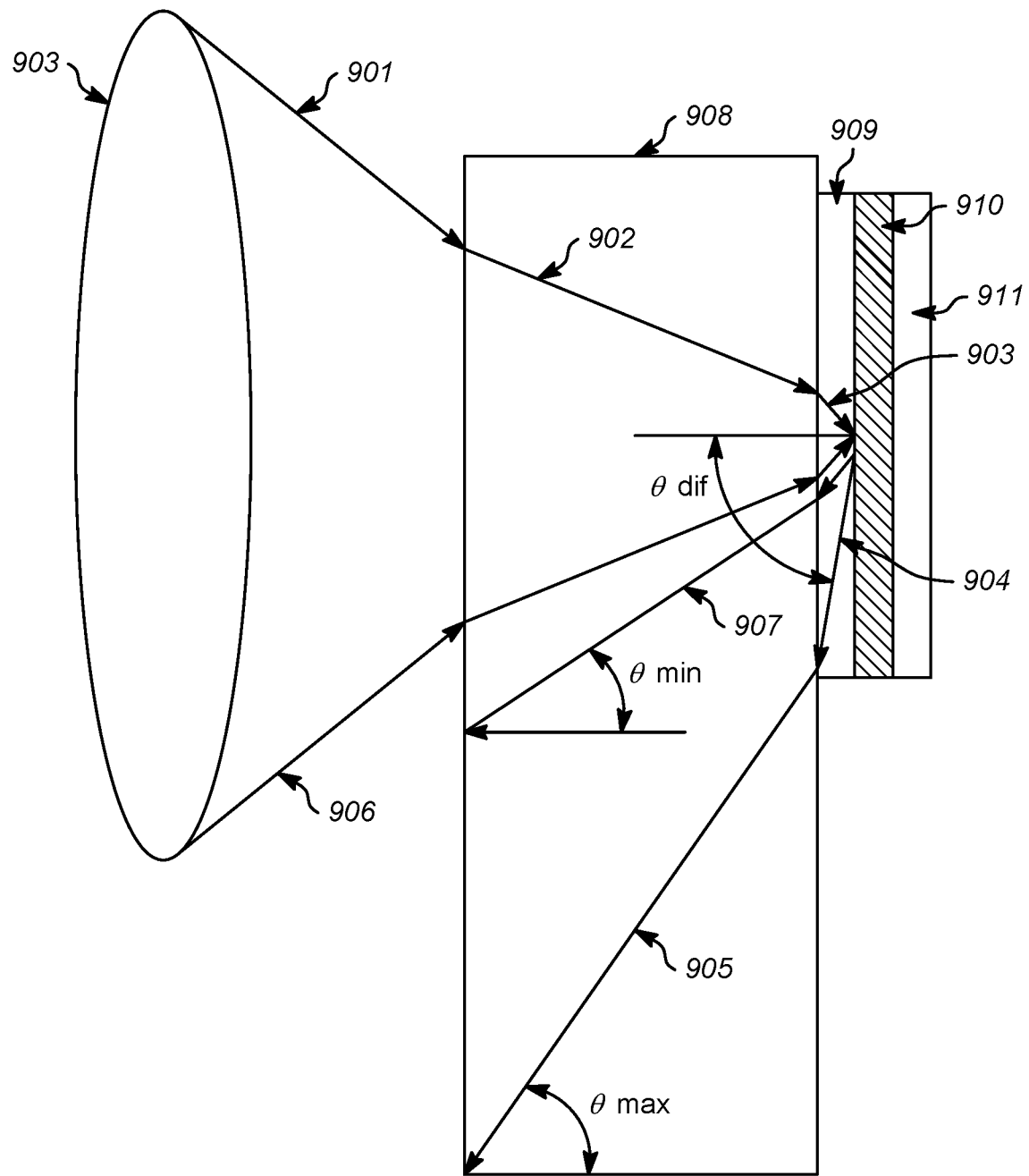
FIG. 9 is a diagram that illustrates how the maximum angle of light beam can be limited by the refractive index of the base material of a HOE.

An example shown in FIG. 9 illustrates how the maximum angle θmax of light beam 905 is limited by the refractive index of the base material of a HOE 909, 910. If the refractive index of the base material of the HOE is smaller than that of the waveguide 908, the diffracted beam 904 that is diffracted by the HOE cannot exceed 90 degrees and θmax is limited by the TIR angle between the material of the waveguide 908 and the base material of the HOE 909.

Figure 10:
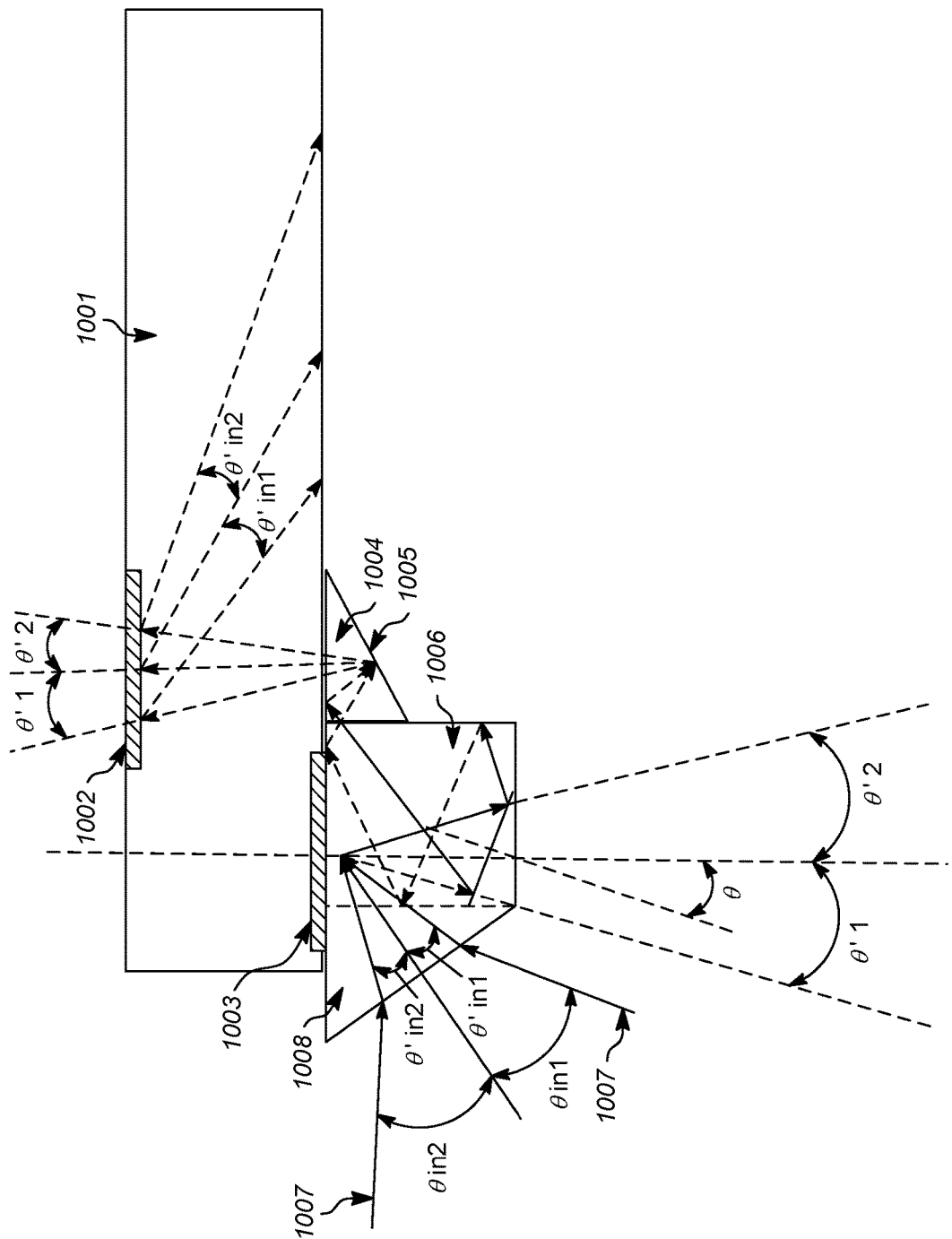
FIG. 10 is a diagram that illustrates an embodiment of a distortion-free light pipe and light guide system.

The subtending angle dθout of diffracted light beams 402 and 407 as shown in FIG. 4 is substantially larger than incoming beam angle dθi 401 due to diffraction and the light beams 402 and 407 must be within total internal reflection. This limits the angle of incoming light beams 405 and 406. Another example implementation is shown in FIG. 10 to avoid this potential limitation. A structure is shown in FIG. 10 wherein the subtending angle θin (θin1+θin2) of incoming light beams 1007 is reduced by a high refractive index prism 1008 and diffracted by a DOE 1003, which reduces the angle further, e.g., to θ'in (θ'θin1+θ'in2). An example is shown in which the original incoming beam angle θin is 60 degrees and is reduced to 40 degrees by a high refractive index prism 1008 and 20 degrees after the diffraction by the DOE 1003. The angle of a light beam can be reduced to ⅓ in this example. After propagating the light beams with this reduced angle through a light pipe 1001, this example shows widening the angle by the second DOE 1002, then propagating inside a waveguide, then widening to the original angle to the human eye. The use of this technique (Compress=>propagate inside light pipe and waveguide=>Uncompress=>eyes) enables even a 90-degree FOV. This technique facilitates a distortion-free image, because two DOEs compensate distortions caused by each other so long as the two DOEs are parallel.

Figure 11:
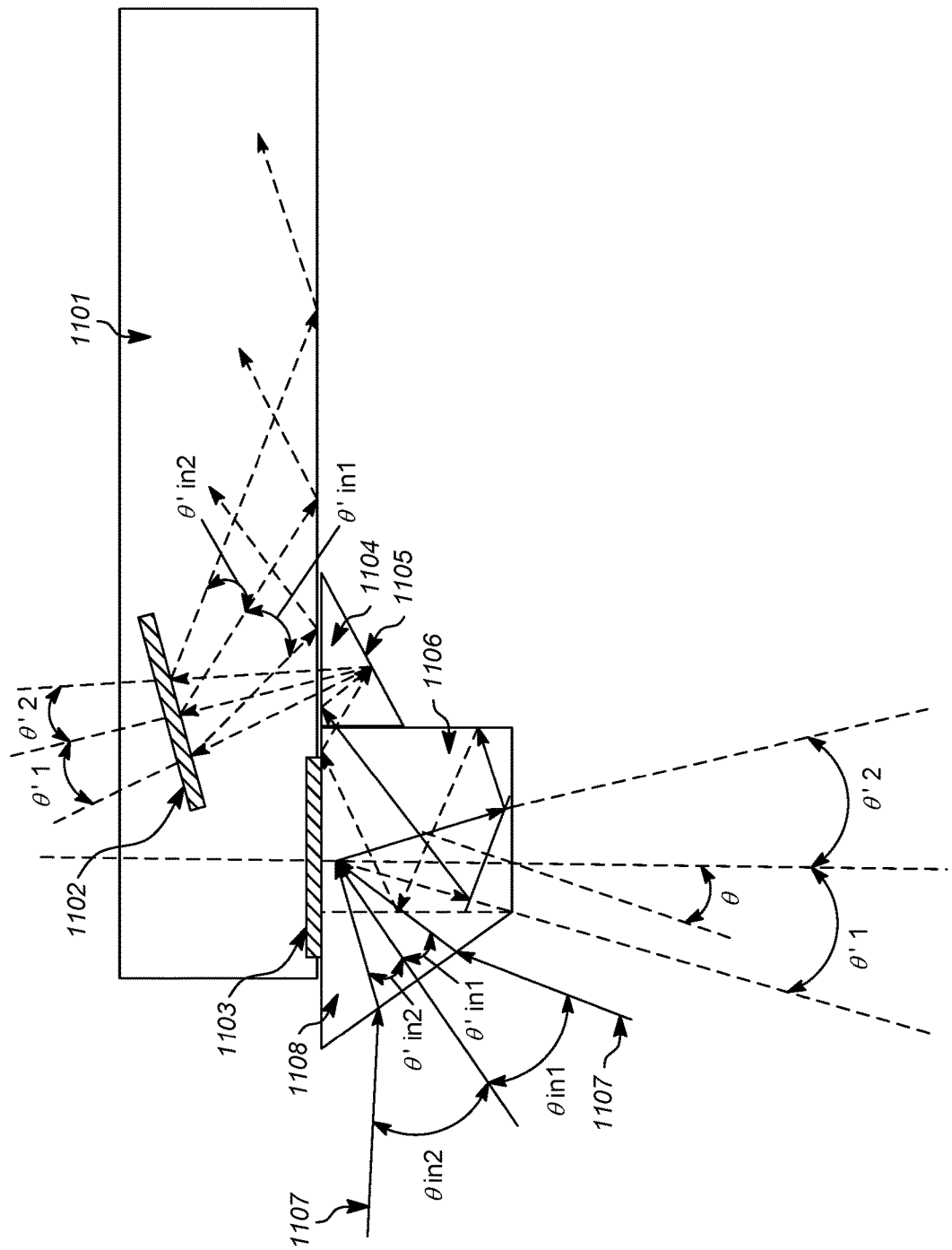
FIG. 11 is a diagram that illustrates another embodiment of distortion-free light pipe and light guide system.

Another example implementation is shown in FIG. 11. By tilting a DOE 1102, the FOV can be enlarged even further than in the example in FIG. 10, although a rotational distortion may take place. The rotational distortion can be compensated by rotating the display system.

Figure 12:
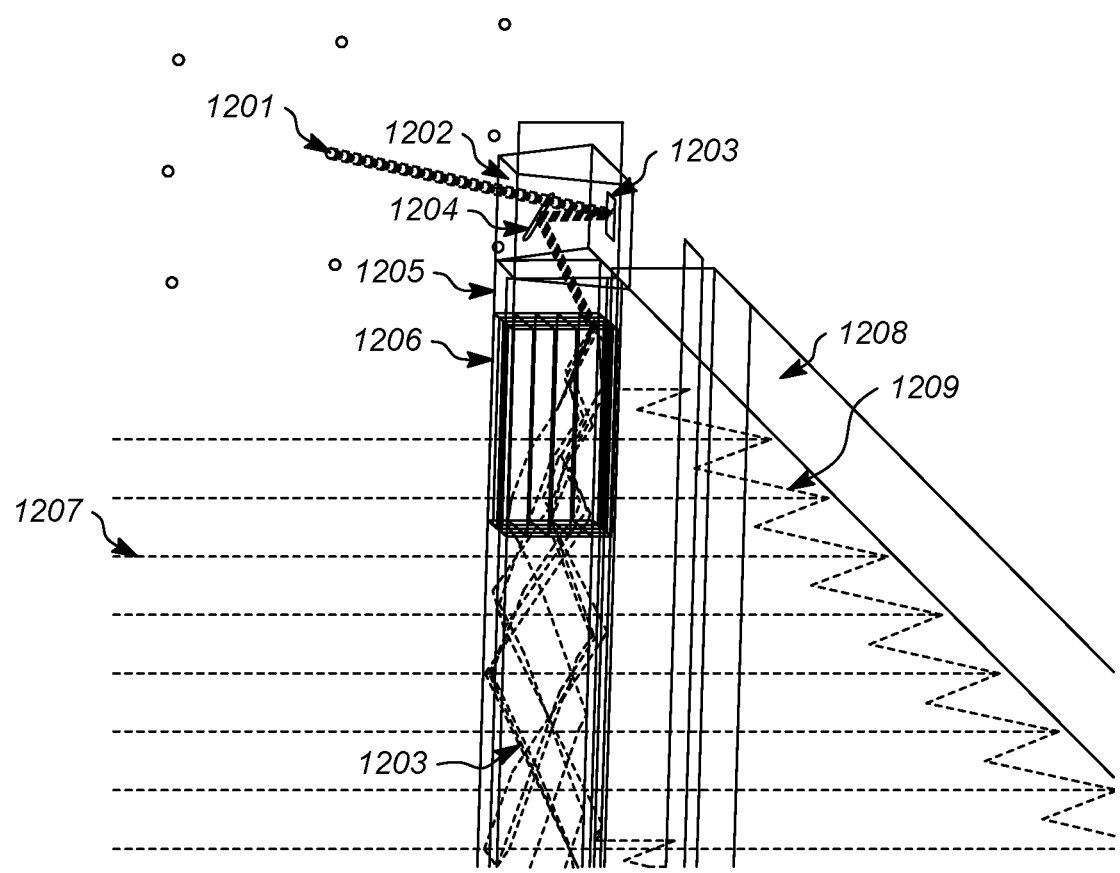
FIG. 12 is a perspective view to show the right path inside a light pipe and a waveguide.

Another example display system is shown in FIG. 12, where half-mirrors are inserted in the light pipe to increase the number of beams keeping the same propagation angles. This will reduce the distance between two beams in the waveguide.

Figure 13A:
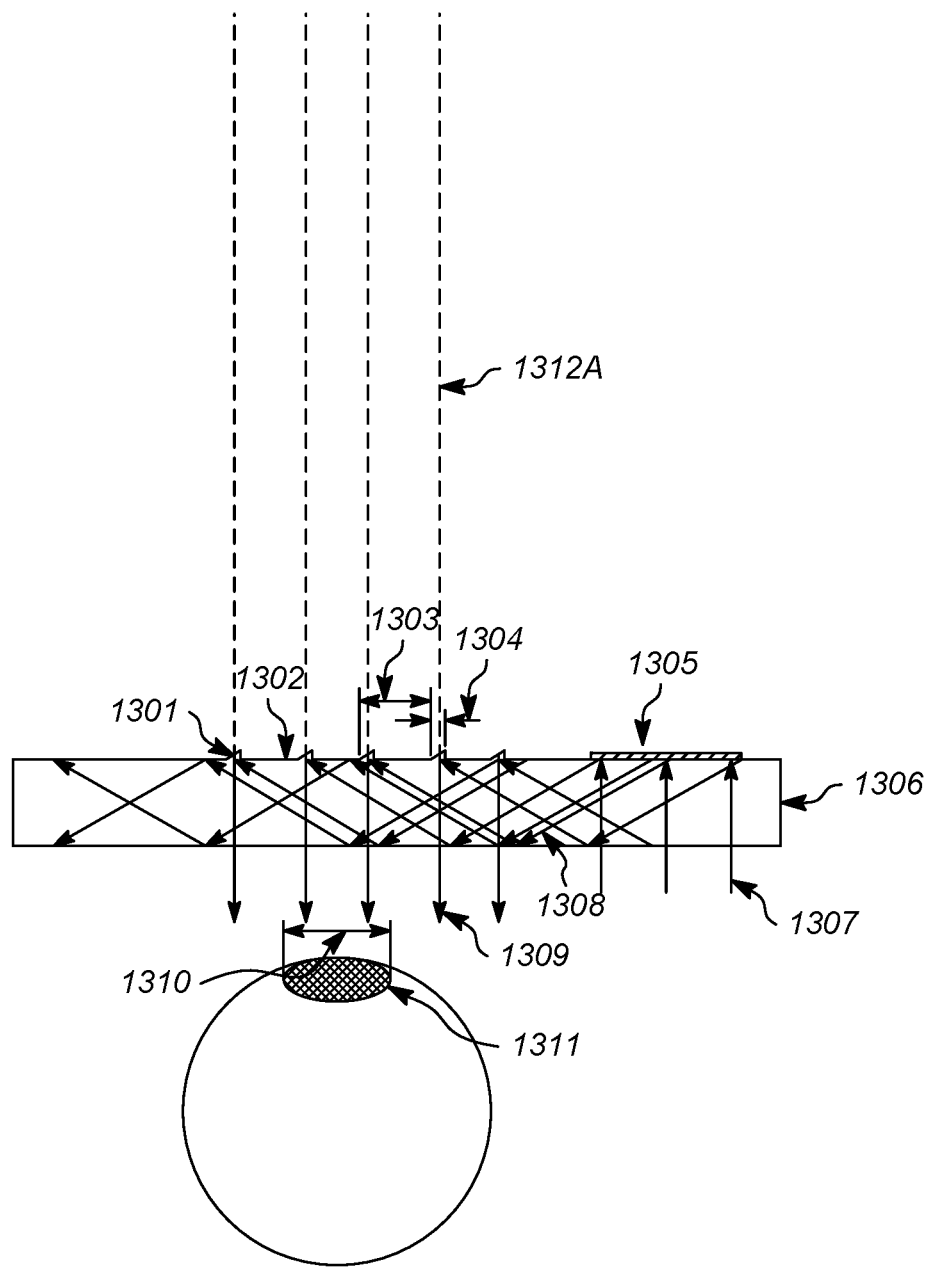
FIG. 13A is a diagram of an example embodiment forming an image at an infinite distance.
Figure 13B:
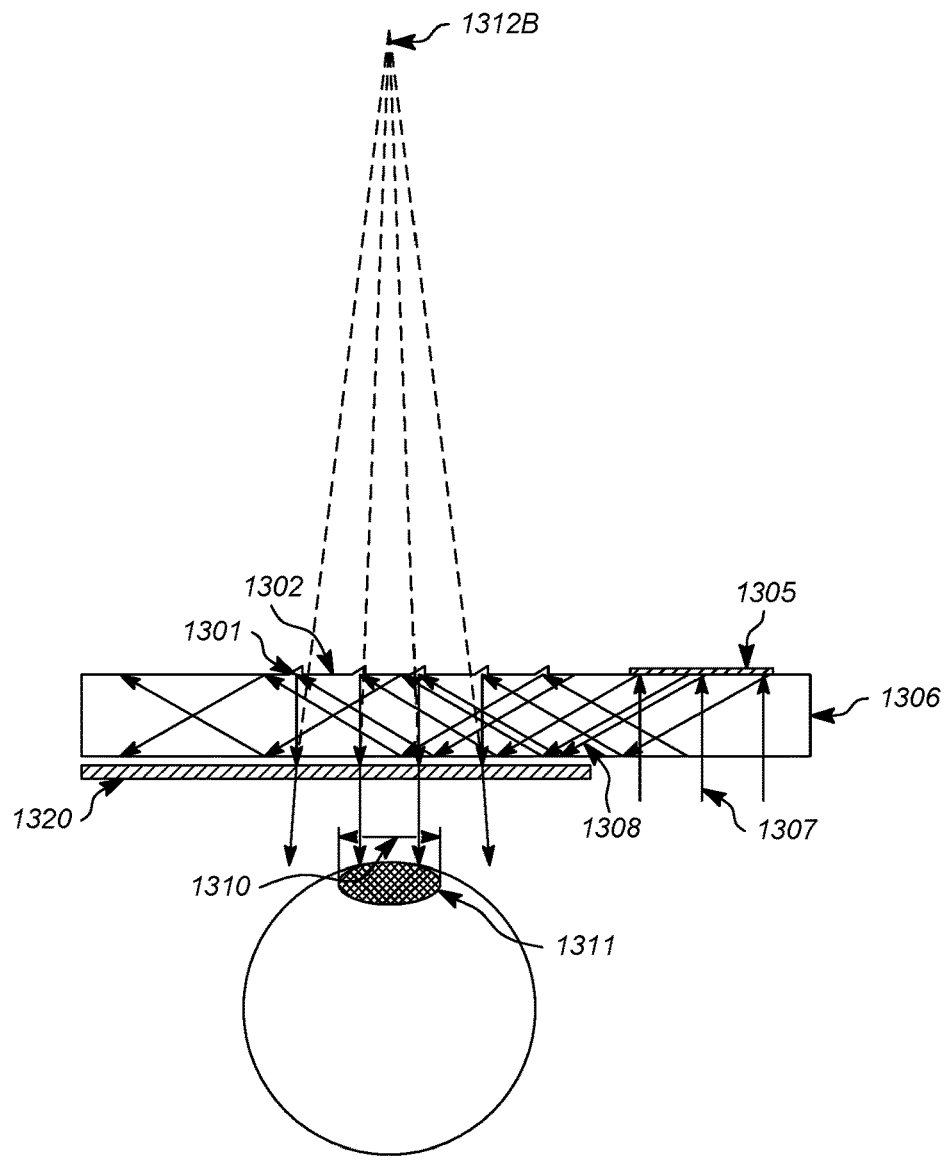
FIG. 13B is a diagram of an example embodiment forming an image at an arbitrary distance, which can be electronically controllable.

Light beam trajectories are shown in FIG. 13A for light diffracted from an in-coupling DOE 1305 where the location of images is at an infinite distance because the beams coming from a single pixel are parallel. An example is shown in FIG. 13B wherein the location of images can be electronically controllable using a variable focal length diffractive lens with liquid crystal material electro-statically driven by a driver 1320 to vary its refractive index.

Figure 14:
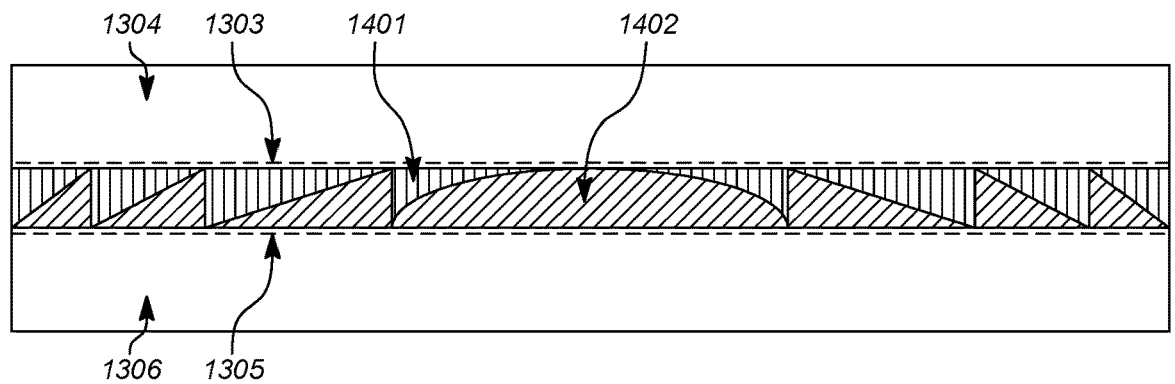
FIG. 14 is a diagram of an example of a structure of an electronically controllable variable focal distance lens.

An example of the variable focal length lens is shown in FIG. 14. The refractive index of liquid crystal can be changed by applying electro-static voltage up to 0.2. However, this is not enough to control the image distance by a refractive lens. The diffractive lens shown in FIG. 14 can change its focal length enough, because diffraction bends light much more than refraction lens. Multiple images can be displayed sequentially at multiple distances by the single DOE lens with liquid crystal driven voltages. Each image can be synchronized with the focal distance adjusted by the DOE lens. For example, person-A is displayed at 3 m distance at time-1 and person-B is displayed at 10 m distance at time-2 and house-A is displayed at 100 m distance at time-3 and a background scene is displayed at an infinite distance at time-4. If these images are switched fast enough, the viewer will not notice the changes and will recognize the resulting combined scene as a virtual and/or augmented reality 3D scene as vergence and accommodation coincide (e.g., not as stereoscopic, but as a so called "light field").

Figure 15A:
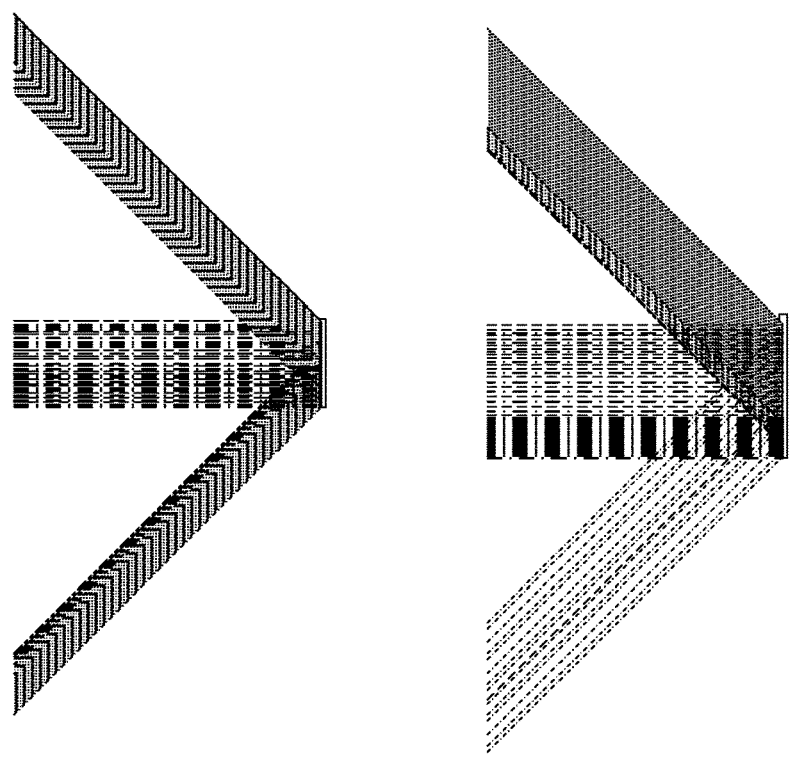
FIGS. 15A and 15B are diagrams of an example embodiment of a very wide angle FOV with 90 degrees (horizontal)×90 degrees (vertical) simulated by an optical design tool.
Figure 15B:
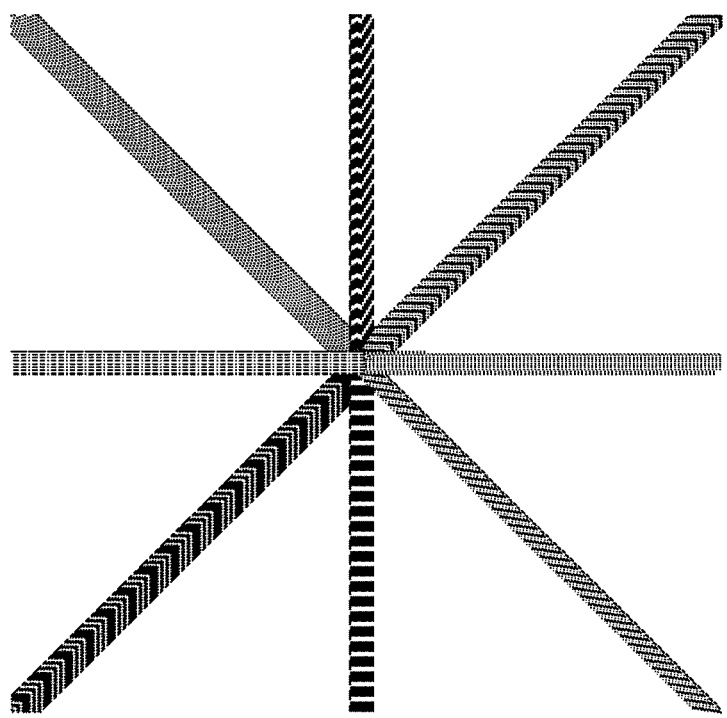

An example of super wide FOV augmented reality (AR) display having 90° (horizontal)×90° (vertical) was successfully designed and simulated with a optical design tool and shown in FIGS. 15A and 15B.

Figure 16:
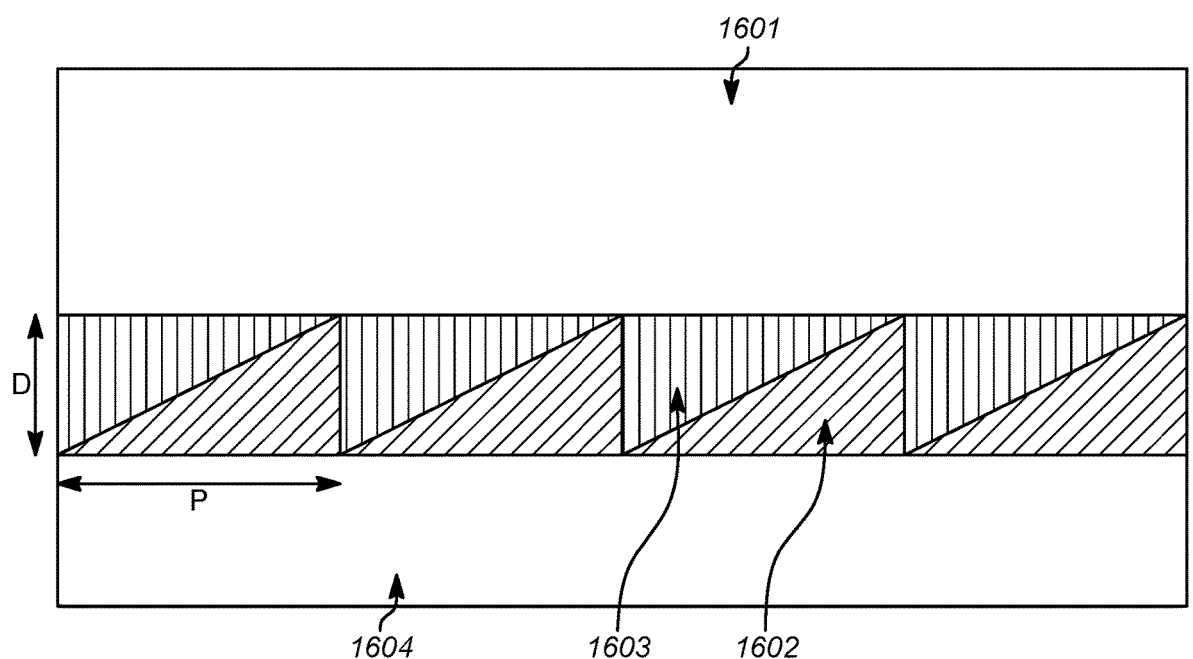
FIG. 16 is a diagram of a structure of a DOE capable of diffracting three primary colors into a same direction with a single layer of a DOE.
Figure 17:
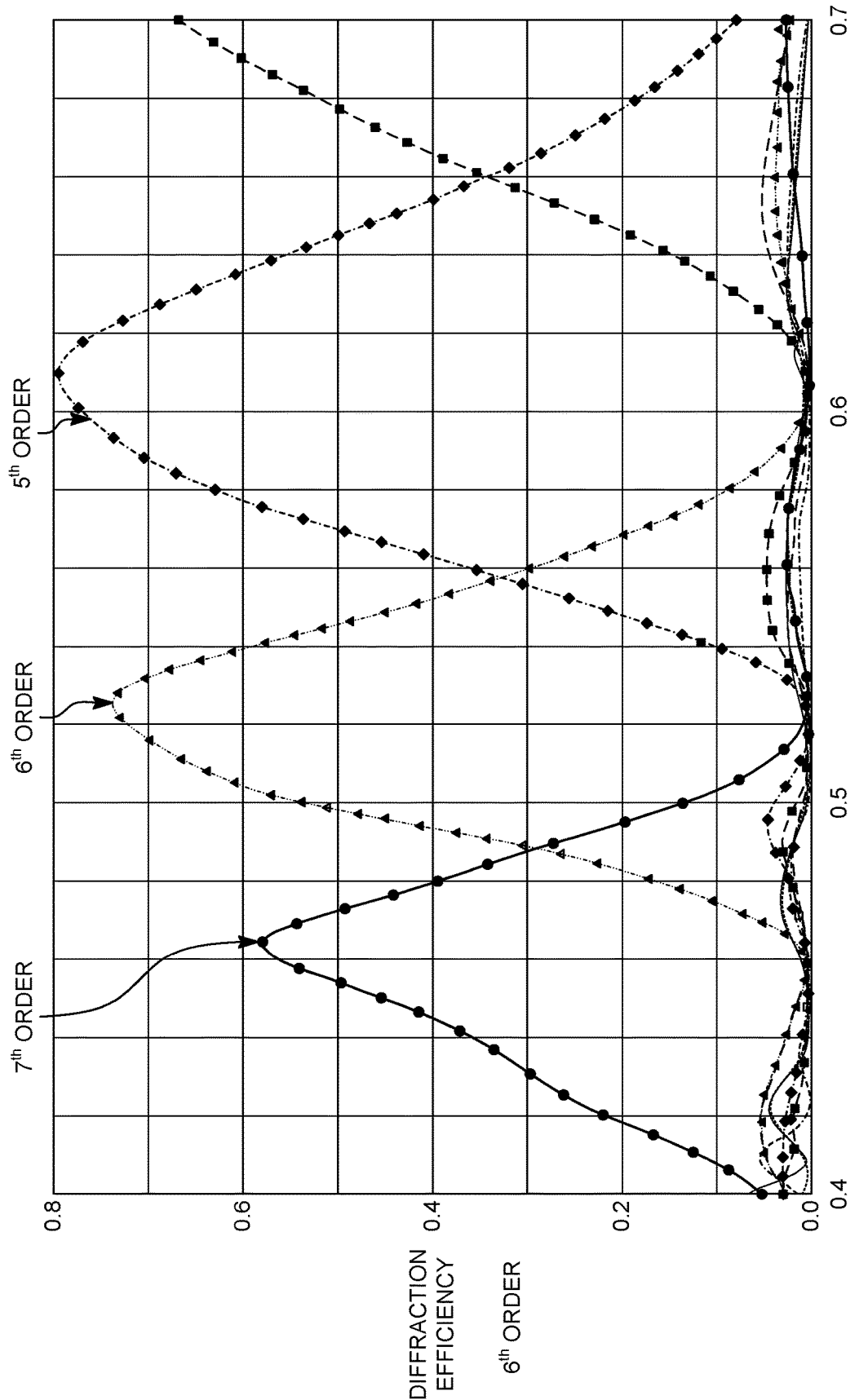
FIG. 17 is a plot of the diffraction efficiency vs. a wavelength of incoming light for the DOE shown in FIG. 16.

An example of a DOE implementation is shown in FIG. 16. Without being bound by theory, the relation between the angle of incoming light and the angle of outgoing light can be given by $$\sin(\theta out)-\sin(\theta in)=m/\lambda*\text{constant(function of pitch of grooves, such as the saw-tooth shaped mirrors)}$$

where θout=the angle of outgoing light to the normal direction of DOE surface

θin=the angle of incoming light to the normal direction of DOE surface m=diffraction order λ=wavelength of light If the first order of diffraction is used for a DOE, the outgoing angle will differ depending of the incoming light's wavelength. This is the reason why a single DOE may in some cases not be used for different colors, and multi-plate or multi-layer DOE may be used to provide a color display. This disclosure describes a way to use a single layer DOE for 3 primary colors. If different diffraction orders are used for different colors, in other words, m/λ=same for 3 primary colors, for example m=7 for λ=0.45μ(blue), m=6 for λ=0.525μ(green) and m=5 for λ=0.63μ(red), m/λ, =15.555 for all 3 colors. This means that all three colors will be diffracted to a same direction. The next question is whether there is cross contamination, meaning that different order diffraction may come into the field of view and causes cross contamination or so-called ghost image. The chart in FIG. 17 showing the spectrum of diffraction efficiency exemplify the possibility of no cross contamination or very little contamination. This indicates that it is possible to make a single layer DOE for color display.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation to encompass all such modifications and equivalent structures as is permitted under the law.

What is claimed is:

1. A display system for providing light rays toward an eye of a viewer, the display system comprising:
   a display device comprising an array of pixels;
   a set of one or more lenses configured to receive light rays from respective pixels of the display device and project said light rays such that respective angles (θ) of at least two projected light rays are proportional to a respective distance (X), from a center of said array of pixels, of different respective pixels from which the projected light rays are received, where θ is proportional to X such that θ=CX with C being a constant having units of angle divided by distance;
   a light pipe;
   an in-coupling optical element configured to receive light rays from said set of one or more lenses and redirect said projected light rays into said light pipe having three or more sides and at least a portion of surfaces of the sides of said light pipe are reflective by coating or total internal reflection;

an out-coupling light guide; and
one or more mirrors configured to reflect light rays from an exit portion of said light pipe into said out-coupling light guide; wherein
said one or more mirrors include at least a first Fresnel reflector that comprises a plurality of saw-tooth shaped grating elements configured to reflect rays into said out-coupling light guide, and said out-coupling light guide includes a second Fresnel reflector that comprises a plurality of saw-tooth shaped grating elements.

2. The display system of claim 1 wherein:
said in-coupling optical element comprises a prism, and said set of one or more lenses is telecentric, where principal rays emitted from pixels of the display device are substantially perpendicular to the surface of said display device and the principal rays cross each other within or in proximity to said prism.

3. The display system of claim 1 wherein:
said in-coupling optical element comprises a prism, said prism has a reflective surface configured to receive light rays from said set of one or more lenses and to reflect the light rays into said light pipe, and a normal vector of the reflective surface is between 15 and 45 degrees with respect to an optical axis of said set of one or more lenses.

4. The display system of claim 1 wherein:
said in-coupling optical element comprises a prism, said prism has a reflective surface configured to receive light rays from said set of one or more lenses and to reflect the light rays into said light pipe, and a normal vector of the reflective surface is configured to rotate to form an angle between 30 and 60 degrees with respect to a long side of said light pipe.

5. The display system of claim 1 wherein:
said in-coupling optical element comprises a prism, and a refractive index of said prism is over 1.4, and a refractive index of said light pipe is over 1.4.

6. The display system of claim 1 wherein:
a size of the exit portion varies based at least in part on a location of the exit portion along a long side of said light pipe.

7. The display system of claim 1 wherein:
said grating elements of said first Fresnel reflector are curved on a surface of a triangular prism in saw-tooth shape and said surface is tilted between 15 and 45 degrees with respect to a top surface of said light pipe and a normal vector of the first Fresnel reflector is set so that a light ray parallel to an optical axis of said set of one or more lenses is substantially parallel to a normal vector of the top surface of said light pipe.

8. The display system of claim 1 wherein:
said in-coupling optical element comprises a prism, and a refractive index of said prism is over 1.3, a refractive index of said out-coupling light guide is over 1.3, and the refractive index of said prism is substantially equal to the refractive index of said out-coupling light guide.

9. The display system of claim 1 wherein:
said out-coupling light guide has a slant side forming a prism where light rays are able to enter and a normal vector of the slant side is between 15 and 45 degrees with respect to a top surface of said light pipe to enable light rays from said one or more mirrors to be reflected into said out-coupling light guide.

10. The display system of claim 1 wherein:
said out-coupling light guide has a slant side forming a prism where light rays enter and the normal vector of the slant side is between 15 and 45 degrees with respect to a top surface of said light pipe to enable light rays from said one or more mirrors to be reflected into said out-coupling light guide.

11. The display system of claim 1 wherein:
said second Fresnel reflector includes a grating region that includes multiple saw-tooth shaped grating elements configured to reflect light rays from said one or more mirrors toward the eye of the viewer and flat regions between the saw-tooth shaped grating elements, where no saw-tooth shaped grating elements exist in the flat regions, and the out-coupling light guide reflects the light rays by total internal reflection and is substantially transparent so that external light can reach the eye of the viewer, and the grating region includes a reflective coating.

12. The display system of claim 1 wherein:
said second Fresnel reflector includes a grating region that includes multiple saw-tooth shaped grating elements configured to reflect light rays from said one or more mirrors toward the eye of the viewer and flat regions between the saw-tooth shaped grating elements, where dual reflections by both the flat regions and the saw-tooth shaped grating elements are prevented by light absorbing areas.

13. The display system of claim 1 wherein:
at least one of said light pipe or said out-coupling light guide includes one or more layers that are configured to at least partially reflect light to reduce unilluminated areas.

14. The display system of claim 1 wherein:
a surface of said out-coupling light guide includes a curved envelope of multiple flat surfaces so that internally reflected light beams have the same angles as those of a flat surface.

15. The display system of claim 1 wherein:
angles of multiple saw-tooth shaped grating elements of said second Fresnel reflector of said out-coupling light guide vary by location so that an image is focused at a finite distance.

16. The display system of claim 1 further comprising:
a plurality of sets of the display system overlaid so that images at multiple distances are viewable.

17. The display system of claim 1 further comprising:
a plurality of waveguides integrated into a single waveguide using one or more dichroic filters and at least one dichroic cross prism.

18. The display system of claim 1 wherein:
at least one of said out-coupling light guide or said light pipe is coated with a holographic optical element, a diffractive optical element, or a multi-layer thin film so that a total internal reflection angle is reduced to enlarge a field of view of the display system.

19. The display system of claim 1 wherein:
at least one of said out-coupling light guide or said light pipe comprises a lower refractive index material adjacent to said in-coupling optical element and a higher refractive index material within or in proximity to the out-coupling light guide.

20. The display system of claim 1 wherein:
said out-coupling light guide is laminated with a higher refractive index material than a refractive index of said out-coupling light guide, and
said second Fresnel reflector is formed on the higher refractive index material.

21. The display system of claim 1 wherein:
said in-coupling optical element comprises:

a first optical element comprising at least one of a holographic optical element (HOE) or a diffractive optical element (DOE) aligned so that a subtending angle of diffracted light beams is lower than a subtending angle of incoming light beams, and a second optical element comprising at least one of a HOE or DOE placed in the out-coupling light guide to receive light from the light pipe, wherein the second optical element is aligned so that a subtending angle of outgoing light beams is larger than the subtending angle of the incoming light beams, and an angle of outgoing light from a normal direction of the second optical element is substantially equal to an angle of incoming light to a normal direction of the first optical element for a light beam from a same pixel.

22. A display system comprising:

a display device comprising an array of pixels;

a set of one or more lenses configured to receive light rays from respective pixels of the display device and project said light rays such that respective angles ($\theta$) of at least two projected light rays are proportional to a respective distance (X), from a center of said array of pixels, of different respective pixels from which the projected light rays are received, where $\theta$ is proportional to X such that $\theta = CX$ with C being a constant having units of angle divided by distance;

an in-coupling optical element configured to receive light rays from said set of one or more lenses and redirect said projected light rays as redirected light rays;

an out-coupling light guide; and one or more mirrors configured to reflect said redirected light rays into said out-coupling light guide;

wherein a diffractive optical element (DOE) in at least one of the in-coupling optical element or the out-coupling light guide is configured to use 7th order diffraction for light including a blue spectral component, 6th order diffraction for light including a green spectral component, and 5th order diffraction for light including a red spectral component.

23. The display system of claim 22 further comprising:

a light pipe configured to couple light between a first DOE in the in-coupling optical element and a second DOE in the out-coupling light guide.

24. The display system of claim 22 further comprising:

an optical element with an electronically controllable focal distance.

25. The display system of claim 24 wherein:

the optical element with an electronically controllable focal distance is configured to display multiple images at multiple respective distances sequentially synchronized with the display device.

* * * * *